US011675756B2

(12) United States Patent
Obinata et al.

(10) Patent No.: US 11,675,756 B2
(45) Date of Patent: Jun. 13, 2023

(54) DATA COMPLEMENTING SYSTEM AND DATA COMPLEMENTING METHOD

(71) Applicant: Hitachi, Ltd., Tokyo (JP)

(72) Inventors: Aya Obinata, Tokyo (JP); Kay Kitahara, Tokyo (JP); Shunji Kawamura, Tokyo (JP); Natsuki Tsukano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 17/190,185

(22) Filed: Mar. 2, 2021

(65) Prior Publication Data

US 2021/0286782 A1    Sep. 16, 2021

(30) Foreign Application Priority Data

Mar. 10, 2020   (JP) .............................. JP2020-040800

(51) Int. Cl.
*G06F 16/215*    (2019.01)
*G06F 16/23*     (2019.01)

(52) U.S. Cl.
CPC ........ *G06F 16/215* (2019.01); *G06F 16/2365* (2019.01)

(58) Field of Classification Search
CPC ... G06K 9/00; G06T 11/005; G06T 2211/432; G06T 17/00; G06F 16/215; G06F 16/2365; G06F 16/29
See application file for complete search history.

(56) References Cited

U.S. PATENT DOCUMENTS

2017/0230690 A1*  8/2017  Pearlman ............. H04N 19/647
2018/0181693 A1*  6/2018  Yang ........................ G06F 30/20

FOREIGN PATENT DOCUMENTS

JP            6472589 B1     2/2019

OTHER PUBLICATIONS

AAPA: English Translation of Applicant submitted JP6472589 (Year: 2019).*

* cited by examiner

*Primary Examiner* — Taelor Kim
(74) *Attorney, Agent, or Firm* — Procopio, Cory, Hargreaves & Savitch LLP

(57) ABSTRACT

A data complementing system stores cell-region characteristic data that includes values of a plurality of data items regarding a cell region that is a region obtained by dividing the region into a mesh, information indicating a missing data item that is the data item of missing data being data missed in the cell-region characteristic data, external region characteristic data that includes values of a plurality of data items regarding an external region that is different from the region, and an external cell-region characteristic data that includes values of a plurality of data items regarding an external cell region obtained by dividing the external region into a mesh, generates a complement model for generating complement data indicating a value of the missing data item based on the external region characteristic data and the external cell-region characteristic data, and generates the complement data based on the complement model.

11 Claims, 18 Drawing Sheets

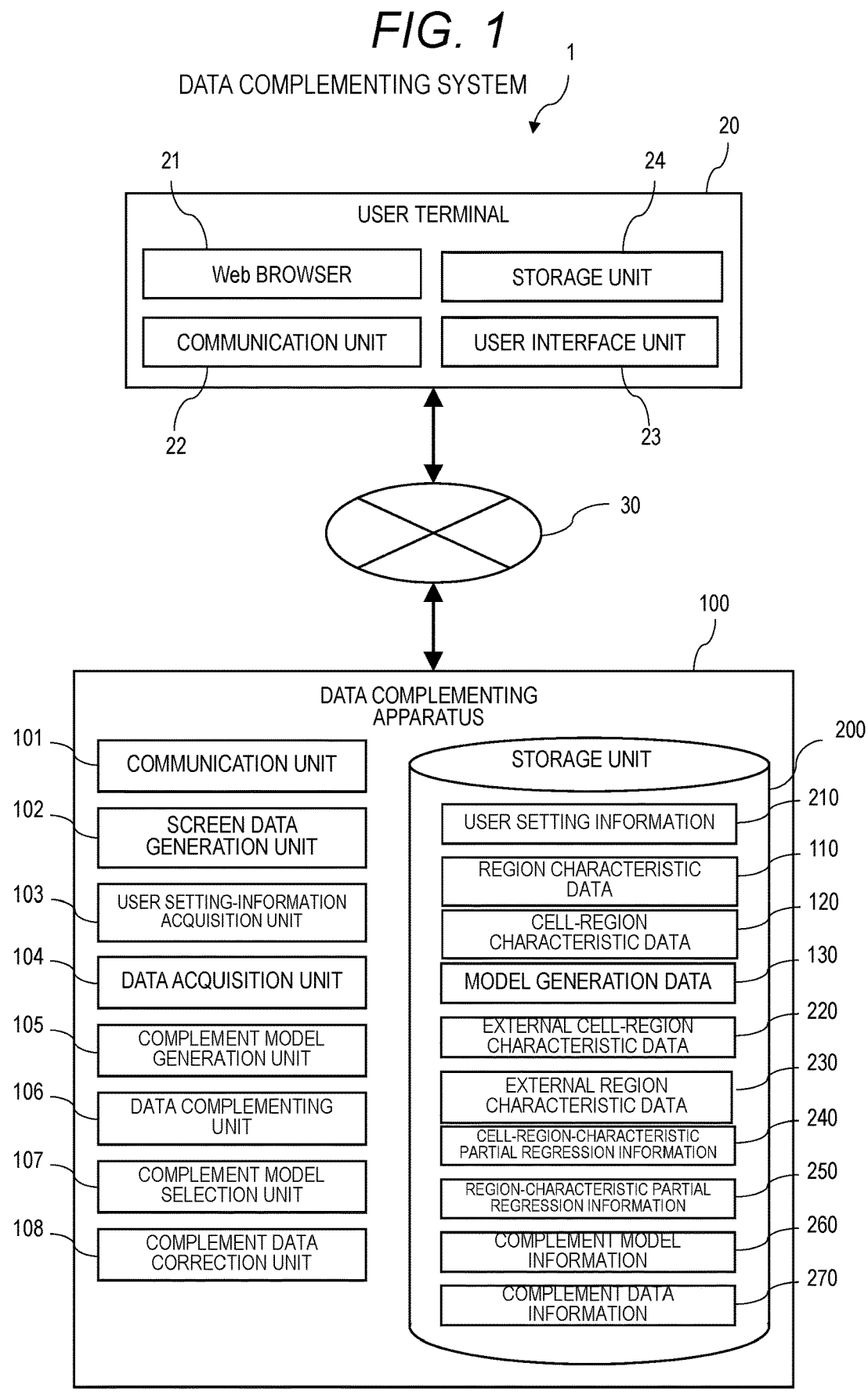

RECTANGULAR REGION 302

REGION 300

CELL REGION 301

RECTANGULAR REGION 302

FIG. 3A

110  
REGION CHARACTERISTIC DATA

| REGION | AREA [km²] | POPULATION [persons] | AGE POPULATION UNDER 15 [persons] | AGE POPULATION OVER 65 [persons] | NUMBER OF OWNED VEHICLES [pieces] | ... |
|---|---|---|---|---|---|---|
| U | 11.46 | 125,223 | 16,189 | 27,334 | 37,283 | ... |

FIG. 3B

120  
CELL-REGION CHARACTERISTIC DATA

| CELL REGION | MESH SIZE (LENGTH OF ONE SIDE) [m] | POPULATION [persons] | AGE POPULATION UNDER 15 [persons] | AGE POPULATION OVER 65 [persons] | ... |
|---|---|---|---|---|---|
| U-001 | 500 | 2,100 | 210 | 630 | ... |
| U-002 | 500 | 2,125 | 200 | 611 | ... |
| U-003 | 500 | 2,074 | 190 | 610 | ... |
| . | . | . | . | . | . |

FIG. 8

REGION-UNIT DATA CHECK SCREEN

5. PLEASE CHECK DATA ITEM YOU HAVE IN UNITS OF REGIONS

- REGION AREA
- ● NUMBER OF OWNED VEHICLES
- NUMBER OF COMPLEX COMMERCIAL FACILITIES
- ROAD AREA
- NUMBER OF FRESH FOOD STORES

6. DO YOU HAVE DATA DESIRED TO BE COMPLEMENTED IN UNITS OF REGIONS?

- ✓ YES
- ☐ NO

[CONFIRM]

FIG. 9

MODEL GENERATION DATA 130

| PATTERN NUMBER | COMPLE-MENT DATA ITEM | SIGNIFI-CANT LEVEL (%) | STATE OF REGION CHARAC-TERISTIC DATA | DATA ITEMS | | | | |
|---|---|---|---|---|---|---|---|---|
| | | | | POPULATION | AGE POPULATION (UNDER 15) | AGE POPULATION (OVER 65) | DISTANCE TO NEAREST STATION | ... |
| p01 | NUMBER OF OWNED VEHICLES [pieces] | 5 | ○ | ○ | × | × | ○ | ... |
| p02 | NUMBER OF OWNED VEHICLES [pieces] | 5 | ○ | ○ | ○ | ○ | × | ... |
| p03 | NUMBER OF OWNED VEHICLES [pieces] | 5 | ○ | × | ○ | ○ | ○ | ... |
| ⋮ | ⋮ | ⋮ | ⋮ | ⋮ | ⋮ | ⋮ | ⋮ | ⋮ |

EXTERNAL CELL-REGION CHARACTERISTIC DATA

| EXTERNAL CELL-REGION | CELL SIZE ONE SIDE OF CELL [m] | EXPLAN-ATORY VARIABLE PATTERN | NUMBER OF OWNED VEHICLES [pieces] | POPULATION [persons] | AGE POPULATION UNDER 15 [persons] | AGE POPULATION OVER 65 [persons] | ... |
|---|---|---|---|---|---|---|---|
| A-001 | 500 | p-02 | 560 | 3100 | 310 | 890 | ... |
| A-002 | 500 | p-02 | 589 | 3215 | 320 | 875 | ... |
| A-003 | 500 | p-02 | 572 | 3121 | 306 | 872 | ... |
| . | . | . | . | . | . | . | . |
| . | . | . | . | . | . | . | . |
| . | . | . | . | . | . | . | . |

EXTERNAL REGION CHARACTERISTIC DATA

| EXTERNAL REGION | NUMBER OF OWNED VEHICLES [pieces] | AREA [km$^2$] | NUMBER OF COMPLEX COMMERCIAL FACILITIES [pieces] | ... |
|---|---|---|---|---|
| A | 74,472 | 32.1 | 13 | ... |
| B | 28.412 | 14.2 | 3 | ... |
| C | 66,910 | 22.3 | 6 | ... |
| . | . | . | . | . |
| . | . | . | . | . |
| . | . | . | . | . |

FIG. 14A

CELL-REGION CHARACTERISTIC PARTIAL REGRESSION INFORMATION

240

| REGION | SIGNIFI-CANCE | $b_0$ | $b_1$ | $b_2$ | $b_3$ | ... |
|---|---|---|---|---|---|---|
| A | × | 2.15 | 3.22 | 2.64 | 16.22 | ... |
| B | ○ | 2.56 | 3.19 | 1.27 | 10.15 | ... |
| C | ○ | 1.97 | 3.25 | 6.24 | 18.29 | ... |
| . | . | . | . | . | . | . |
| . | . | . | . | . | . | . |
| . | . | . | . | . | . | . |

FIG. 14B

CELL-REGION CHARACTERISTIC PARTIAL REGRESSION INFORMATION

250

| CELL-REGION CHARAC-TERISTIC PARTIAL REGRESSION COEFFICIENT | AVERAGE | SIGNIFI-CANCE | REGION-CHARACTERISTIC PARTIAL REGRESSION COEFFICIENT | | |
|---|---|---|---|---|---|
| | | | $g_1$ | $g_2$ | |
| $b_0$ | - | × | 2.15 | 3.22 | ... |
| $b_1$ | - | ○ | 2.56 | 3.19 | ... |
| $b_2$ | - | ○ | 1.97 | 3.25 | ... |
| . | . | . | . | . | . |
| . | . | . | . | . | . |
| . | . | . | . | . | . |

FIG. 15

USE COMPLEMENT MODEL SELECTION SCREEN

DATA ITEM TO BE COMPLEMENTED: NUMBER OF OWNED VEHICLES

RECOMMENDED USE COMPLEMENT MODEL INFORMATION:

EXPLANATORY VARIABLE USED IN GENERATION OF MODEL:
- AGE POPULATION UNDER 15
- AGE POPULATION OVER 65
- DISTANCE TO NEAREST STATION

REGION-UNIT CONVERSION VALUE: 65,461

DEVIATION: 3.7 %

EXPLANATORY VARIABLE PATTERN AND SIGNIFICANCE RATIO

| PATTERN NO. | EXPLANATORY VARIABLE | SIGNIFICANCE RATIO | |
| --- | --- | --- | --- |
| | | CELL ANALYSIS | REGION ANALYSIS |
| P01 | POPULATION, DISTANCE TO NEAREST STATION | 25 % | 30 % |
| p02 | AGE POPULATION (UNDER 15), AGE POPULATION (OVER 65) | 80 % | 75 % |
| p03 | AGE POPULATION (UNDER 15), AGE POPULATION (OVER 65), DISTANCE TO NEAREST STATION | 93 % | 95 % |
| ⋮ | ⋮ | ⋮ | ⋮ |

PLEASE INPUT USE MODEL No.: No. 03

WHEN YOU HAVE ACTUAL VALUE IN UNITS OF REGIONS
DO YOU FURTHER CORRECT COMPLEMENT DATA?
☑ YES    ☐ NO

PROCEED TO NEXT

COMPLEMENT MODEL INFORMATION

| EXPLANATORY VARIABLE PATTERN (PATTERN NUMBER) | COMPLEMENT MODEL (REGRESSION MODEL EQUATION) | REGION CONVERSION VALUE | DEVIATION | SIGNIFICANCE | |
|---|---|---|---|---|---|
| | | | | SIGNIFICANCE RATIO (CELL ANALYSIS) | SIGNIFICANCE RATIO (REGION ANALYSIS) |
| p01 | $y = 2.15 + (5.16 + 1.2D_1 + 2.3D_2 + \ldots)x_1 + \ldots$ | 47,975 | -24% | 25% | 30% |
| p02 | ... | ... | ... | ... | ... |
| p03 | ... | ... | ... | ... | ... |
| . | . | . | . | . | . |
| . | . | . | . | . | . |
| . | . | . | . | . | . |

COMPLEMENT DATA INFORMATION

| CELL REGION | EXPLANATORY VARIABLE PATTERN (PATTERN NUMBER) | | | |
|---|---|---|---|---|
| | p01 | p01 | p01 | ... |
| U-001 | 780 | 772 | 785 | ... |
| U-002 | 792 | 764 | 793 | ... |
| U-003 | 775 | 751 | 780 | ... |
| . . . | . . . | . . . | . . . | . . . |

DATA COMPLEMENTING SYSTEM AND DATA COMPLEMENTING METHOD

CROSS-REFERENCE TO RELATED APPLICATION

This application claims priority based on Japanese patent application, No. 2020-040800 filed on Mar. 10, 2020, the entire contents of which are incorporated herein by reference.

BACKGROUND

Technical Field

The present invention relates to a data complementing system and a data complementing method.

Related Art

Japanese Patent No. 6472589 discloses a map data processing apparatus that complements map data of a data missing region in which attribute data is missing, in the map data including the attribute data of features, which is used in various operations such as various planning and business evaluation by business entities such as local governments, retailers and delivery companies. The map data processing apparatus searches a plurality of regions, and acquires similar regions similar to the data missing region. The map data processing apparatus generates complemented map data in which the missing data is completed in the map data of the data missing region, based on the map data of the similar region. The map data processing apparatus analyzes data based on the map data including the complemented map data, and determines suitability of the analysis result based on the complemented map data. When the determination result is appropriate, the map data processing apparatus outputs the complemented map data.

The map data processing apparatus disclosed in Japanese Patent No. 6472589 complements the missing data of the map data including the attribute data of the feature of the data missing region, based on the data of the region similar to the data missing region. Therefore, in a case where there is no region similar to the data missing region, there is a possibility that it is not possible to complement the missing data.

SUMMARY

An object of the present invention is to provide a data complementing system and a data complementing method capable of efficiently complementing missing data in data regarding a region.

To achieve the above object, an aspect of the present invention provides a data complementing system. The data complementing system includes a storage unit and a complement model generation unit. The storage unit is configured to store region characteristic data that includes values of a plurality of data items regarding a predetermined region, cell-region characteristic data that includes values of a plurality of data items regarding a cell region that is a region obtained by dividing the region into a mesh, information indicating a missing data item that is the data item of missing data being missed in the cell-region characteristic data, external region characteristic data that includes values of a plurality of data items regarding an external region that is different from the region, and an external cell-region characteristic data that includes values of a plurality of data items regarding an external cell region obtained by dividing the external region into a mesh. The complement model generation unit is configured to generate a complement model for generating complement data that is for complementing the missing data, based on the external region characteristic data and the external cell-region characteristic data.

In addition, the details of one or more implementations of the subject matter described in the specification are set forth in the accompanying drawings and the description below. Other features, aspects, and advantages of the subject matter will become apparent from the description, the drawings, and the claims.

According to the present disclosure, it is possible to complement data that is missing in data regarding a region, with high efficiency.

BRIEF DESCRIPTION OF THE DRAWINGS

FIG. 1 is a diagram illustrating a schematic configuration of a data complementing system to be described as an embodiment;

FIG. 3A is a diagram illustrating an example of region characteristic data;

FIG. 3B is a diagram illustrating an example of cell-region characteristic data;

FIG. 8 illustrates an example of a region-unit data check screen;

FIG. 9 is a schematic diagram illustrating an example of model generation data;

FIG. 11A illustrates an example of external cell-region characteristic data;

FIG. 11B illustrates an example of external region characteristic data;

FIG. 14A is a diagram illustrating an example of cell-region characteristic partial regression information;

FIG. 14B is a diagram illustrating an example of region-characteristic partial regression information;

FIG. 15 is a diagram illustrating an example of a use complement model selection screen;

FIG. 17 is a diagram illustrating an example of complement model information.

DESCRIPTION OF EMBODIMENTS

Hereinafter, an embodiment will be described with reference to the drawings. In the following description, the same or similar components may be denoted by the same reference signs, and repetitive description may be omitted. In the following description, the letter "s" in front of the reference sign means a processing step.

FIG. 1 illustrates a schematic configuration of an information processing system (referred to as a "data complementing system 1" below) which will be described as an embodiment. A user of the data complementing system 1 is, for example, the local government or a service provider.

When planning and implementing services for regions such as cities, wards, and blocks, local governments and service providers collect region characteristic data that includes various types of information (various data items and values of the data items) regarding a region as a target of a service, and perform a work such as data analysis using the collected region characteristic data. Examples of the data items include the area, the number of households, the population, the age distribution, and the number of registered automobiles in a region.

When performing the work using the region characteristic data, the data complementing system 1 generates complement data for complementing missing data which is data missed in the region characteristic data.

For the purpose of providing high-quality services, local governments and service providers divide a region into a plurality of mesh-like (for example, 500 m×500 m) regions (referred to as a "cell region") below), and handle cell-region characteristic data being various types of information (various data items and values of the data items) regarding the cell region, along with region characteristic data. Examples of the data items include the area, the number of households, the population, and the age distribution in a cell region.

Figure 2A:
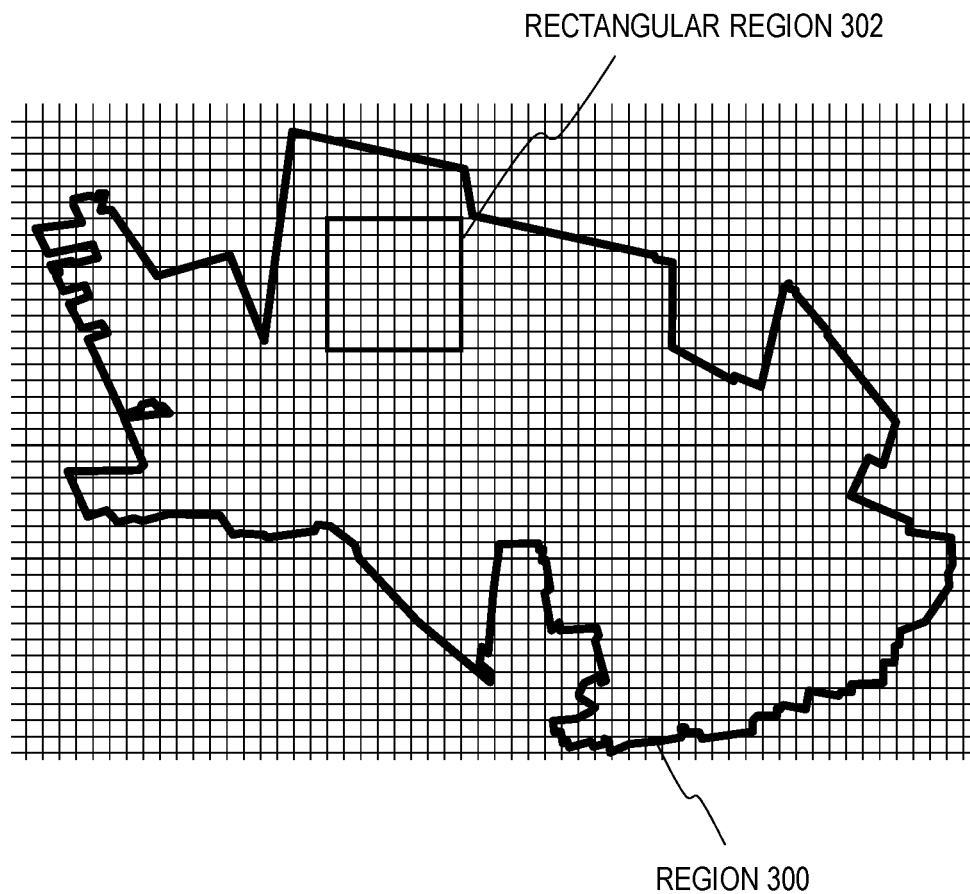
FIG. 2A is a diagram illustrating an example of a region.
Figure 2B:
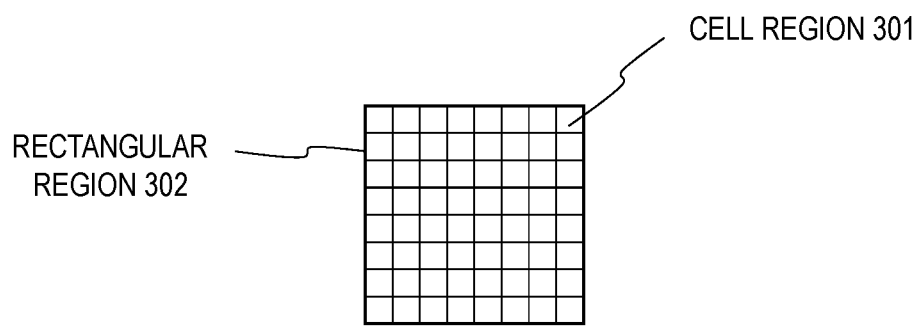
FIG. 2B is a diagram illustrating an example of a cell region.

FIGS. 2A and 2B illustrate the concept of a region 300 and a cell region 301. FIG. 2A is a diagram illustrating the entirety of the region 300 such as a city. FIG. 2B is an enlarged view of a rectangular region 302 illustrated in FIG. 2A.

FIG. 3A is a diagram illustrating an example of region characteristic data 110. As illustrated in FIG. 3A, the region characteristic data 110 is data in which, for a region (identifier of the region), the area of the region and values of a plurality of data items (population, age population under 15, age population over 65, number of owned vehicles, and the like) are associated with each other.

FIG. 3B illustrates an example of cell-region characteristic data 120. As illustrated in FIG. 3B, the cell-region characteristic data 120 is a data in which, for a cell region (identifier of the cell region), a cell size representing the area of the cell region and values of a plurality of data items (population, age population under 15, age population over 65, and the like) are associated with each other.

Some data items (for example, number of owned vehicles in the region characteristic data 110 illustrated in FIG. 3A) are provided in the region characteristic data 110, but are not provided in the cell-region characteristic data 120. The value of a missing data item, which is such a data item not provided in the cell-region characteristic data 120, is the above-described missing data. The data complementing system 1 generates complement data for such missing data.

The data complementing system 1 generates the complement data based on external region characteristic data or external cell-region characteristic data. The external region characteristic data is data including various types of information (various data items and values of the data items) regarding an external region that is a region other than a region as a target of a service. The external cell-region characteristic data refers to various types of information (various data items and values of the data items) regarding an external cell region that is a region obtained by dividing the external region into a mesh (for example, 500 m×500 m).

As illustrated in FIG. 1, the data complementing system 1 includes a user terminal 20 and a data complementing apparatus 100. Both the user terminal 20 and the data complementing apparatus 100 are configured using an information processing apparatus (computer), and are connected to each other to be able to communicate with each other via a wired or wireless communication network 30. The communication network 30 is, for example, a local area network (LAN), a wide area network (WAN), the Internet, a dedicated line, and various data communication networks.

The user terminal 20 is managed by, for example, a local government or a service provider who plans and implements a service. The user terminal is operated by a person (referred to as a "user" below) who performs the above-described work. The data complementing apparatus 100 provides the user terminal 20 with various services related to complementing missing data.

Figure 4:
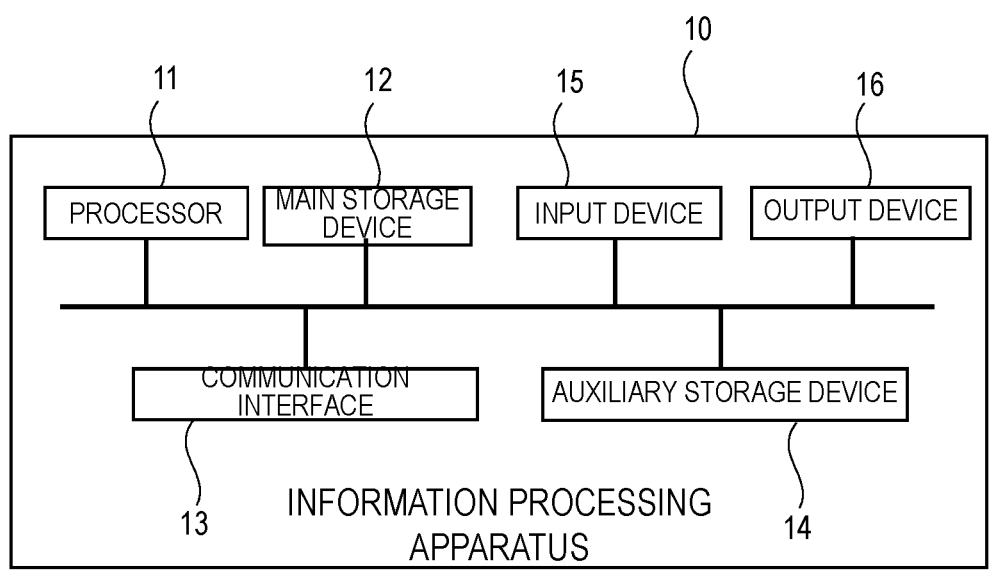
FIG. 4 illustrates an example of a hardware configuration of an information processing apparatus used in a configuration of the data complementing system.

FIG. 4 illustrates an example of a hardware configuration of an information processing apparatus 10 constituting the user terminal 20 or the data complementing apparatus 100. As illustrated in FIG. 4, the information processing apparatus 10 includes a processor 11, a main storage device 12, a communication interface 13, and an auxiliary storage device 14.

The processor 11 is configured using, for example, a central processing unit (CPU), a micro processing unit (MPU), a graphics processing unit (GPU), an artificial intelligence (AI) chip, a field programmable gate array (FPGA), a system on chip (SoC), and an application specific integrated circuit (ASIC).

The main storage device 12 stores programs and data, and includes, for example, a read only memory (ROM), a random access memory (RAM), and a non-volatile memory (NVRAM).

The communication interface 13 communicates with another information processing apparatus via the communication network 30, and includes a wireless or wired communication module (wireless communication module, communication network adapter, USB module, and the like).

The auxiliary storage device 14 stores programs and data, and includes, for example, a solid state drive (SSD), a hard disk drive, an optical storage medium (compact disc (CD), digital versatile disc (DVD), and the like), an IC card, and an SC card. The auxiliary storage device 14 stores programs and data for realizing the functions of the data complementing apparatus 100. The auxiliary storage device 14 may write and read programs and data via a reading device of a recording medium or the communication interface 13. Programs and data stored in the auxiliary storage device 14 are read out to the main storage device 12 at any time.

An input device 15 is a user interface that receives a user input and a data input from the outside of the information processing apparatus. For example, the input device includes a keyboard, a mouse, a touch panel, a card reader, and a voice input device (for example, a microphone).

An output device 16 is a user interface that outputs various types of information to the user, and includes a display device (liquid crystal display, organic EL panel, and the like) that displays various types of information, an audio output device (for example, speaker) that outputs various types of information by audio, a printer that performs printing on a paper medium, and the like.

The information processing apparatus 10 includes, for example, a personal computer (desktop type or notebook type), a smartphone, a tablet, and a general-purpose machine. The information processing apparatus 10 may be realized using virtual information processing resources such as a cloud server provided by a cloud system, for example. The information processing apparatus 10 may be configured by a plurality of information processing apparatuses distributed on a communication network. For example, software for realizing an operating system, a file system, a database management system (DBMS) (relational database, NoSQL, and the like), a key-value store (KVS), or the like may be installed on the information processing apparatus 10.

Various functions of the user terminal 20 or the data complementing apparatus 100 are realized in a manner that the processor 11 of the information processing apparatus 10 constituting the user terminal or the data complementing apparatus reads and executes one or more programs stored in the main storage device 12. Alternatively, the various functions are realized by the hardware of the information processing apparatus 10 constituting the user terminal or the data complementing apparatus. The program may be stored in the auxiliary storage device 14 in advance. If necessary, the program may be stored in the auxiliary storage device 14 from a non-temporary storage device of another apparatus via the communication network 30, or from a non-temporary storage medium.

As illustrated in FIG. 1, the user terminal 20 includes the functions of a Web browser 21, a communication unit 22, a user interface unit 23, and a storage unit 24. The Web browser 21 displays information transmitted from the data complementing apparatus 100, transmits information received from the user to the data complementing apparatus 100, and the like. The communication unit 22 realizes a communication with the data complementing apparatus 100 via the communication network 30. The user interface unit 23 realizes interactive processing with the user via the input device 15 and the output device (display device) 16.

The data complementing apparatus 100 includes the functions of a storage unit 200, a communication unit 101, a screen data generation unit 102, a user setting-information acquisition unit 103, a data acquisition unit 104, a complement model generation unit 105, a data complementing unit 106, a complement model selection unit 107, and a complement data correction unit 108.

Among the above functions, the storage unit 200 stores data of each of user setting information 210, region characteristic data 110, cell-region characteristic data 120, model generation data 130, external cell-region characteristic data 220, external region characteristic data 230, cell-region-characteristic partial regression information 240, region-characteristic partial regression information 250, complement model information 260, and complement data information 270. The storage unit 200 stores each type of data, for example, as a database table provided by the DBMS, a file provided by a file system, and KVS data. Details of the data will be described later.

The communication unit 101 communicates with the user terminal 20 via the communication network 30.

The screen data generation unit (output unit) 102 functions as a Web server. The screen data generation unit transmits, for example, data (for example, image data or script for realizing the user interface) described in a format such as the hypertext markup language (HTML), the extensible markup language (XML), and the JavaScript (registered trademark) object notation (JSON), to the Web browser 21 of the user terminal 20 via the communication unit 101.

The user setting-information acquisition unit (receiving unit) 103 acquires information (referred to as "user setting information" below) transmitted from the user terminal 20. The user setting-information acquisition unit 103 may be realized as a function of the above-described Web server. The storage unit 200 stores the user setting information acquired by the user setting-information acquisition unit 103 as the user setting information 210. The user setting-information acquisition unit 103 acquires region characteristic data and cell-region characteristic data, which are transmitted from the user terminal 20. The storage unit 200 stores the pieces of data acquired by the user setting-information acquisition unit 103, as the region characteristic data 110 and the cell-region characteristic data 120, respectively.

The data acquisition unit 104 acquires external region characteristic data and external cell-region characteristic data from an accessible information source (database, Web server, and the like which are accessible via the communication network 30) via the communication network 30. The storage unit 200 stores the pieces of data acquired by the data acquisition unit 104, as the external region characteristic data 230 and the external cell-region characteristic data 220, respectively.

The complement model generation unit 105, the data complementing unit 106, the complement model selection unit 107, and the complement data correction unit 108 generate a complement model based on the data acquired by the user setting-information acquisition unit 103 and the data acquisition unit 104, and generate complement data based on the generated complement model. The complement model is a model for generating information which is for complementing (predicting) the above-described missing data. Details of the functions will be described later.

Figure 5:
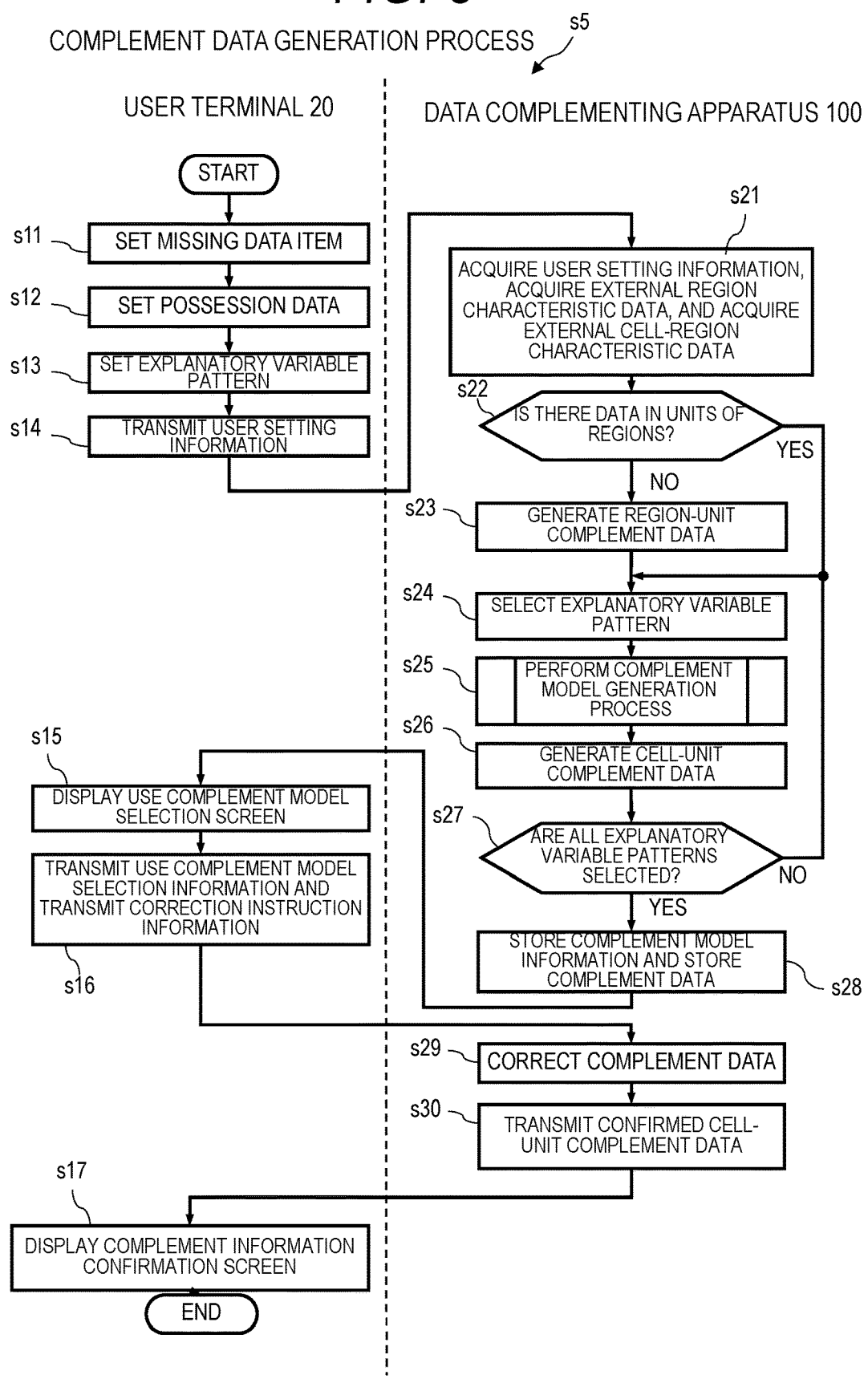
FIG. 5 is a flowchart illustrating an example of a complement data generation process.

FIG. 5 is a flowchart illustrating a process (referred to as a "complement data generation process s5" below) of generating complement data by the data complementing apparatus 100. The complement data generation process s5 will be described with reference to FIG. 5.

Firstly, the user setting-information acquisition unit 103 in the data complementing apparatus 100 transmits a screen (referred to as a "user information setting screen 40" below) for setting the above-described missing data items and the like, to the user terminal 20. The user terminal 20 receives and displays the user information setting screen 40. The user inputs a missing data item (also referred to as a "complement data item" below) desired to be complemented on the user information setting screen 40 (s11). The details of the user information setting screen 40 will be described later.

Then, the user sets data (cell-region characteristic data, and region characteristic data) possessed by the user, which can be used for generating the complement data, on the user information setting screen 40 (s12).

The data complementing apparatus 100 transmits a screen (referred to as an "explanatory variable setting screen 50" below) for setting a data item group (referred to as an "explanatory variable pattern" below) of the region characteristic data used as an explanatory variable when generating a complement model. The user terminal 20 receives and displays the explanatory variable setting screen 50. The user sets one or more explanatory variable patterns by performing a predetermined input operation such as selection of one or more data items as explanatory variables on the explanatory variable setting screen 50 one or more times (s13). The details of the explanatory variable setting screen 50 will be described later.

Then, the user terminal 20 transmits the information (user setting information) set in s11 to s13, the cell-region characteristic data, and the region characteristic data to the data complementing apparatus 100 via the communication network 30 (s14). In the transmission, the user terminal 20 displays a screen (referred to as a "region-unit data check screen 60" below) for checking whether or not the user terminal stores region-unit data (whether or not the user terminal is capable of providing the region-unit data), so as to check whether or not the user has the region-unit data. The region-unit data refers to region characteristic data including the value of the missing data item. The user terminal 20 transmits the result of the above check to the data complementing apparatus 100 along with the above information.

The user setting-information acquisition unit 103 in the data complementing apparatus 100 receives the user setting information, the cell-region characteristic data, the region characteristic data, and the result of the above check, which are transmitted from the user terminal 20 (s21). The data complementing apparatus 100 determines the result of the above check (s22). When the user has the region-unit data (s22: YES), the data complementing apparatus performs processing from s24. When the user does not have the region-unit data (s22: NO), the data complementing apparatus 100 performs processing from s23.

In s23, the data complementing apparatus 100 generates region-unit complement data for the received region characteristic data. The region-unit complement data is region characteristic data in which the value of the missing data item is complemented in units of regions. The data complementing apparatus 100 generates the region-unit complement data by a method of, for example, replacing the missing data item with data having a meaning similar to that of the missing data item among items of the region characteristic data 110 of another region, which are possessed by the user. The process of s23 may not be necessarily executed (that is, the region-unit complement data may not be generated). In this case, the process proceeds to the next process of s24. As a case where the process of s23 is not performed, for example, the data complementing apparatus 100 may determine that it is not possible to generate region-unit complement data with the required accuracy, based on information of region characteristic data possessed by the user, which indicates, for example, that external region characteristic data having similar values of the data items other than the missing data item (complement data item) is not provided.

The processes of s24 to s27 are processes (loop processes) that are repeatedly executed while sequentially selecting explanatory variable patterns. In s24, the data complementing apparatus 100 selects one explanatory variable pattern that has not yet been targeted by the loop processes s25 to s26 from one or more explanatory variable patterns set by the user in s13.

The complement model generation unit 105 in the data complementing apparatus 100 performs a process (referred to as a "complement model generation process s25" below) of generating the complement model, that is, generating the complement model by using the items of the cell-region characteristic data 120 and the items of the region characteristic data 110, which correspond to the explanatory variables belonging to the explanatory variable pattern selected in s24. The information regarding the complement model generated by the complement model generation process s25 is stored in the storage unit 200 as the complement model information 260. The details of the complement model generation process s25 will be described later.

The data complementing unit 106 in the data complementing apparatus 100 substitutes the values of the region characteristic data 110 and the cell-region characteristic data 120 into the complement model generated by the complement model generation process s25 to obtain the value of the missing data item. Then, the data complementing unit generates a cell-unit complement data which is complement data in units of cells, by using the obtained values (s26). The generated cell-unit complement data is stored in the storage unit 200 as the complement data information 270.

The data complementing unit 106 generates region conversion complement data being data obtained by converting the value of the cell-unit complement data of all the cell regions of the region into the value in units of the regions by performing processing such as obtaining the total or the average. The data complementing unit 106 obtains the deviation between the region conversion complement data and the region-unit data (region-unit complement data when the region-unit complement data is generated in s23). The data complementing unit 106 obtains the above deviation from, for example, the following equation.

$$\text{Deviation} = (\text{value of region conversion complement data} - \text{value of region-unit data(value of region-unit complement data)})/\text{value of region-unit data(value of region-unit complement data)} \quad \text{Equation 1}$$

When the user does not have the region-unit data and does not calculate the region-unit complement data, the deviation is "no value".

The data complementing apparatus 100 determines whether or not the loop processes s25 to s26 have been completed for all the explanatory variable patterns set in s13. When the loop processing s25 to s26 have not been completed for all explanatory variable patterns (s27: NO), processing returns to s24. If loop processing s25 to s26 is completed for all explanatory variable patterns (s27: YES), processing proceeds to s28.

In s28, the data complementing apparatus 100 transmits the information regarding the complement model generated in s25 to s26 and the information regarding the complement data, to the user terminal 20 via the communication network 30.

The data complementing apparatus 100 transmits a screen (referred to as a "use complement model selection screen 70" below) for causing the user to select the use complement model, to the user terminal 20. The user terminal 20 receives and displays the use complement model selection screen 70, and receives, from the user, a designation of a complement model (referred to as a "use complement model" below) to be used by the user (s15). When the user has the region-unit data, the user selects whether or not to correct the "cell-unit complement data" complemented using the use complement model, on the use complement model selection screen 70.

Then, the user terminal 20 transmits the information of the use complement model selected in s15 and information (referred to as "correction necessity information" below) indicating whether or not to correct the "cell-unit complement data" complemented using the selected use complement model, to the data complementing apparatus 100 via the communication network 30 (s16).

When the data complementing apparatus 100 receives the information of the use complement model and the correction necessity information, which are transmitted from the user terminal 20, the data complementing apparatus generates "confirmed cell-unit complement data" being data in which contents of the cell-unit complement data are confirmed, based on the received information (s29). More specifically, the data complementing apparatus 100 firstly checks the correction necessity information. When the correction necessity information indicates at least any of a case of "not corrected", a case where the user does not have the region-unit data, and a case where the use complement model is selected based on the significance, the data complementing apparatus 100 sets the "cell-unit complement data" itself generated using the use complement model, as the confirmed cell-unit complement data. When the correction necessity information indicates "correct", the complement data correction unit 108 in the data complementing apparatus 100 corrects the cell-unit complement data generated using the use complement model selected by the user in s15, so as to generate the confirmed cell-unit complement data. Specifically, the complement data correction unit 108 generates the confirmed cell-unit complement data by, for example, calculating a coefficient from the deviation obtained in s26 and multiplying the calculated coefficient by the cell-unit complement data.

The data complementing apparatus 100 transmits the confirmed cell-unit complement data generated in s29, to the user terminal 20 via the communication network 30 (s30).

When the user terminal 20 receives the confirmed cell-unit complement data transmitted from the data complementing apparatus 100, the user terminal displays a screen (referred to as a "complement information confirmation screen 80" below) on which the received confirmed cell-unit complement data, the missing data item (complement data item) registered by the user in s11, the information regarding the use complement model selected by the user in s15, and the like are described (s17).

DETAILED DESCRIPTION

The complement data generation process s5 in FIG. 5 will be described in more detail.

Figure 6:
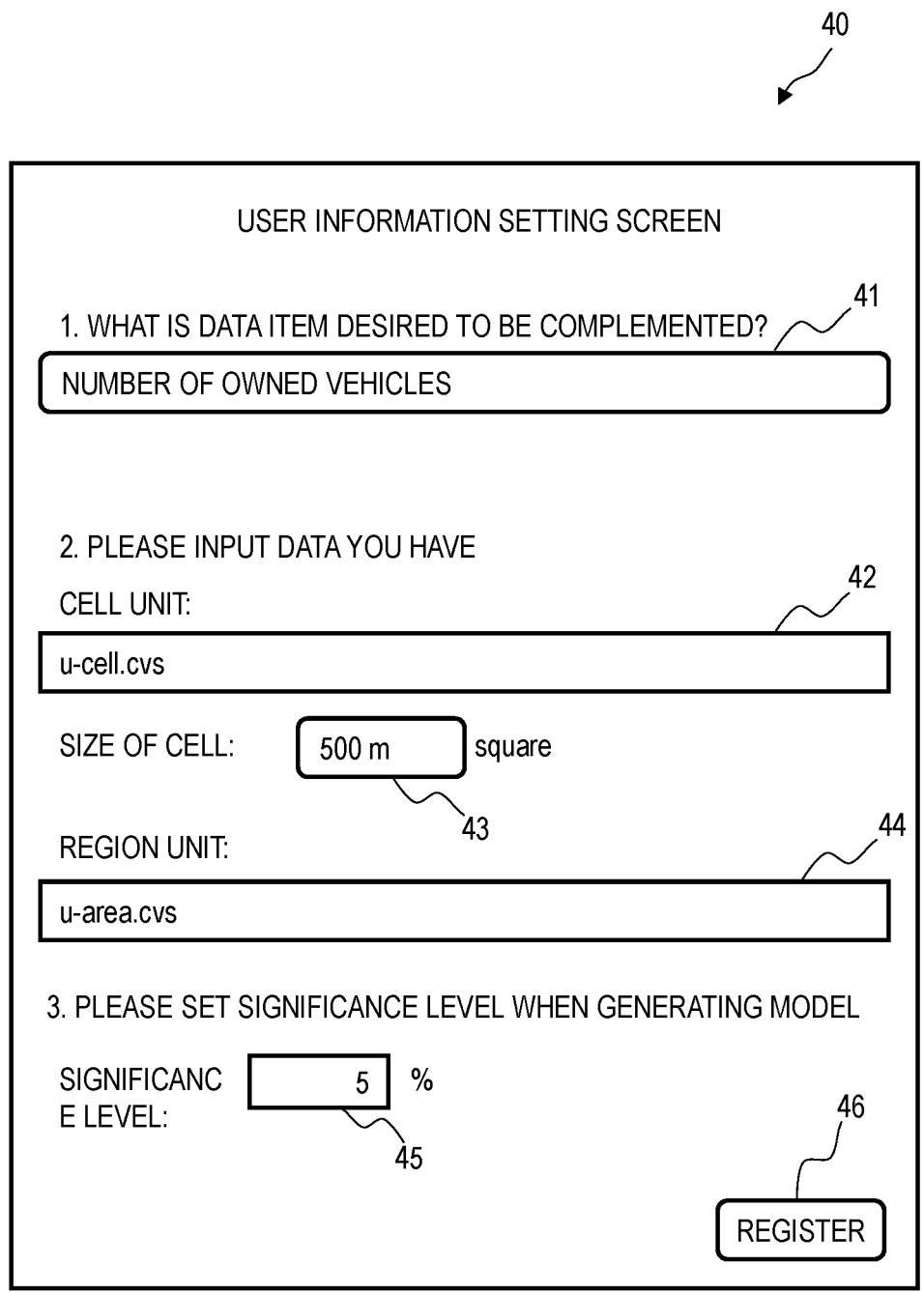
FIG. 6 illustrates an example of a user information setting screen.

FIG. 6 illustrates an example of the user information setting screen 40 displayed by the user terminal 20 in the processes of s11 to s13 of FIG. 5. As illustrated in FIG. 6, the user information setting screen 40 includes a complement data item input field 41, a cell-region characteristic data input field 42, a cell size input field 43, a region characteristic data input field 44, and a complement model significance level input field 45.

In the complement data item input field 41, information (name of the missing data item in this example) for identifying the missing data item (complement data item) of the missing data desired to be complemented by the user among the missing data items of the cell-region characteristic data is input.

In the cell-region characteristic data input field 42, information (for example, information indicating the file name and location of the cell-region characteristic data) for identifying the cell-region characteristic data possessed by the user is input.

In the cell size input field 43, the size (length of one side of a cell in the mesh in this example) of the cell region is input.

In the region characteristic data input field 44, information that specifies the region characteristic data possessed by the user (for example, information indicating the file name and location of the cell-region characteristic data) is input.

In the complement model significance level input field 45, a significance level that serves as a criterion for determining the significance of the complement model generated by the complement model generation unit 105 in the data complementing apparatus 100 is input.

When the user operates a registration button 46, the user terminal 20 starts reception of the explanatory variable pattern (s13 in FIG. 5).

Figure 7:
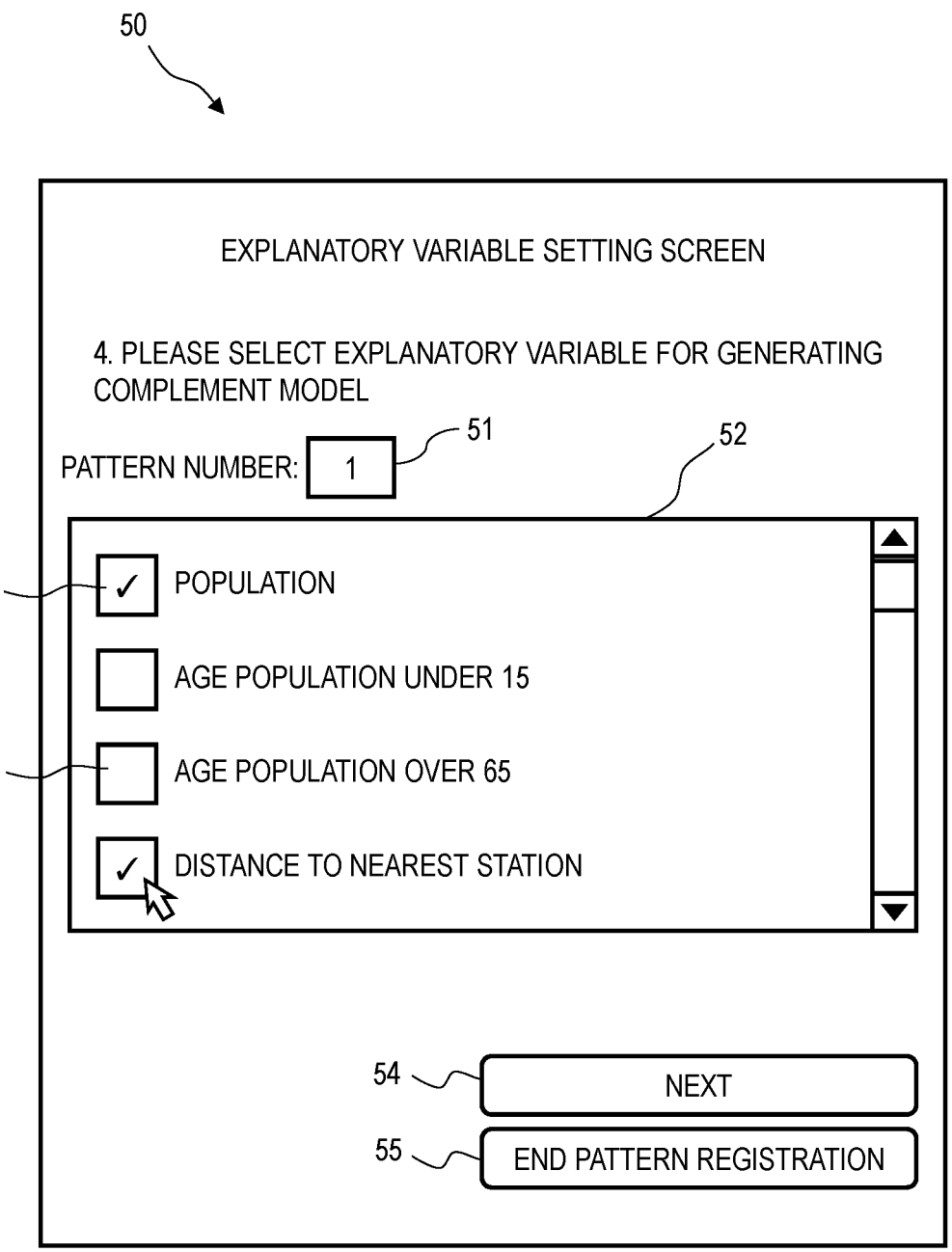
FIG. 7 illustrates an example of an explanatory variable setting screen.

FIG. 7 illustrates an example of the explanatory variable setting screen 50 displayed by the user terminal 20 in s13 of FIG. 5. As illustrated in FIG. 7, the explanatory variable setting screen 50 includes an explanatory variable pattern number display field 51, an explanatory variable selection field 52, a "next" button 54, and a pattern registration end button 55.

An identifier (referred to as a "pattern number" below) of the currently-displayed explanatory variable pattern is set in the explanatory variable pattern number display field 51. The pattern number displayed in the explanatory variable pattern number display field 51 is updated in the order of 1, 2, 3, . . . each time the "next" button 54 is instructed.

In the explanatory variable selection field 52, data items 53 included in the cell-region characteristic data input on the user information setting screen 40 are listed in a state in which the data items can be selected by check boxes. The data item 53 selected by the user in the explanatory variable selection field 52 is used as an explanatory variable in the multiple regression analysis described later.

When the user operates the pattern registration end button 55, the user terminal 20 displays the region-unit data check screen 60 (s14 in FIG. 5). The region-unit data check screen 60 is a screen for causing the user to check whether or not the missing data item (complement data item) input on the user information setting screen 40 is included in the region characteristic data, and for receiving an instruction to transmit the user setting information.

FIG. 8 illustrates an example of the region-unit data check screen 60 displayed by the user terminal 20 in the process of s14 of FIG. 5. As illustrated in FIG. 8, the region-unit data check screen 60 includes a list of data items 61 included in the region characteristic data, and a black circle mark 62 indicating the complement data items designated as being possessed by the user in the list 61, and a checkmark 63 indicating that the user has a complement data item in units of regions (indicating that the complement data item is included in the region characteristic data). When the user operates a confirmation button 64, the user terminal 20 transmits the user setting information set or acquired by the above processing to the data complementing apparatus 100.

FIG. 9 illustrates an example of information (referred to as "model generation data 130" below) transmitted by the user terminal 20 to the data complementing apparatus 100 as the above user setting information. As illustrated in FIG. 9, the model generation data 130 includes the contents of the explanatory variable pattern set by the user on the explanatory variable setting screen 50 (contents in which the pattern number is associated with the data item set as the explanatory variable with the pattern number). In the illustrated model generation data 130, "o" is set for the data item selected by the user, and "x" is set for the data item not selected by the user. Each explanatory variable pattern is uniformly associated with the complement data item "number of owned vehicles" and the significance level "5%".

Figure 10:
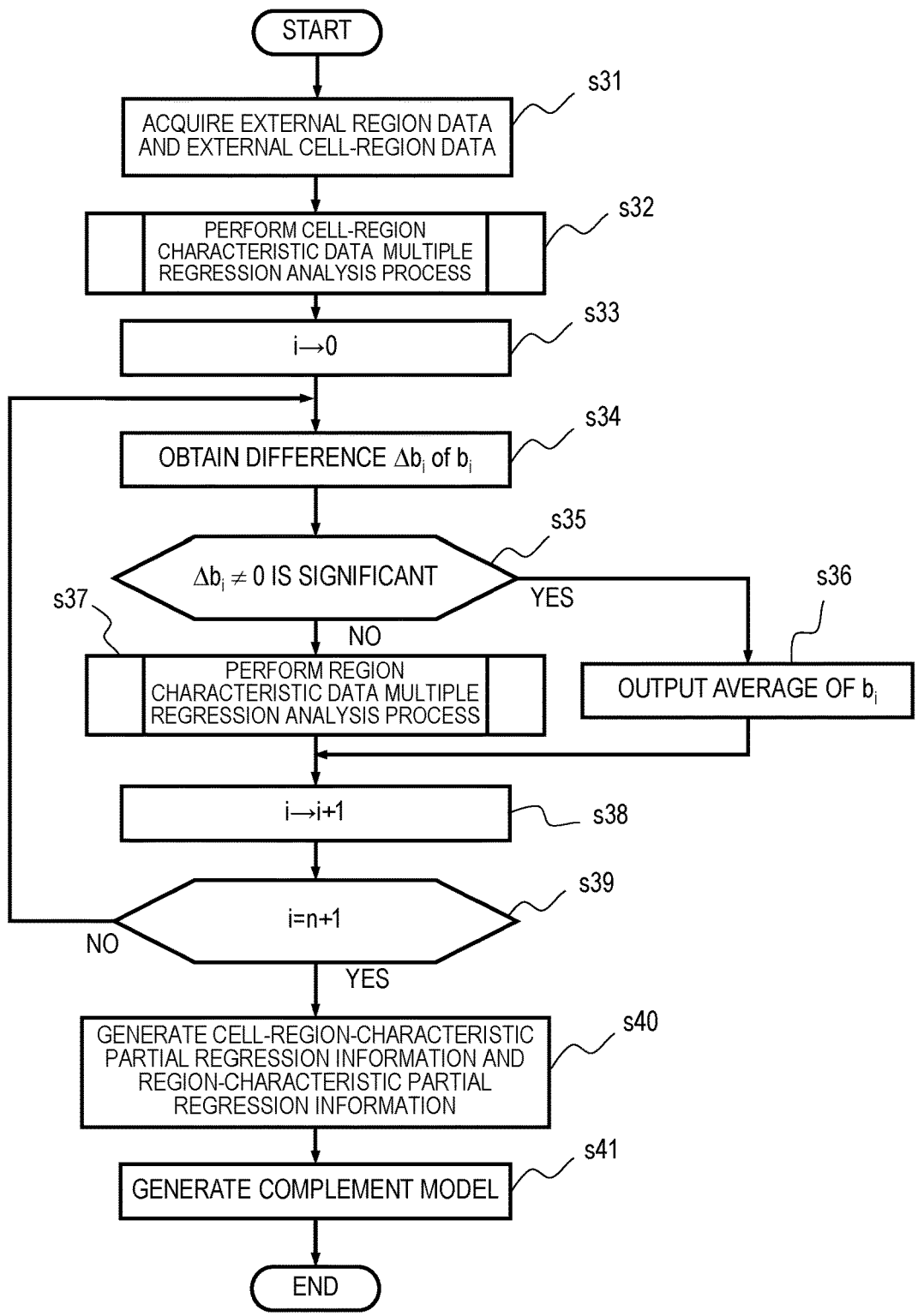
FIG. 10 is a flowchart illustrating an example of a complement model generation process.

FIG. 10 is a flowchart illustrating the details of the complement model generation process s25 in FIG. 5. The complement model generation process s25 will be described below with reference to FIG. 10.

The data acquisition unit 104 firstly acquires the external region characteristic data 230 including the data item and the complement data item designated by one selected explanatory variable pattern and external cell-region characteristic data 220, from an accessible information source (s31). The storage unit 200 stores the external region characteristic data 230 and the external cell-region characteristic data 220, which are acquired by the data acquisition unit 104.

FIG. 11A illustrates an example of the external cell-region characteristic data 220. The external cell-region characteristic data 220 is data in which various data items are associated with the external cell region (identifier of the external cell region). The external cell-region characteristic data 220 includes a data item corresponding to the complement data item designated by the user among the missing data items in the cell-region characteristic data. The illustrated external cell-region characteristic data 220 includes the pattern number of the explanatory variable pattern selected by the complement model generation unit 105.

FIG. 11B illustrates an example of the external region characteristic data 230. The external region characteristic data 230 is data in which data items are associated with an external region (identifier of the external region). The external region characteristic data 230 includes data items corresponding to complement data items.

Returning to FIG. 10, the complement model generation unit 105 performs multiple regression analysis (referred to as a "cell-region characteristic data multiple regression analysis process s32" below) on the external cell-region characteristic data 220 of the external cell region belonging to each external region extracted by the data acquisition unit 104.

Figure 12:
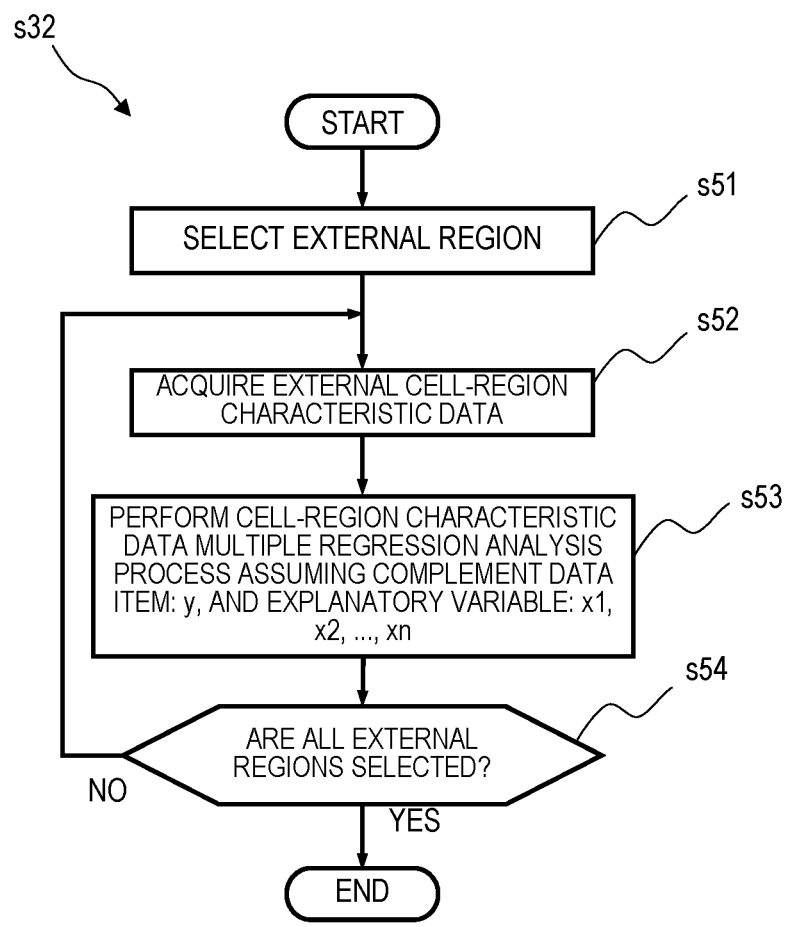
FIG. 12 is a flowchart illustrating an example of a cell-region characteristic data multiple regression analysis process.

FIG. 12 is a flowchart illustrating an example of the cell-region characteristic data multiple regression analysis process s32. Firstly, the complement model generation unit 105 selects one external region (s51), and acquires the external cell-region characteristic data 220 of an external cell region belonging to the selected external region, as the target of multiple regression analysis (s52).

The complement model generation unit 105 performs multiple regression analysis (referred to as "external cell-region characteristic multiple regression analysis" below) on the acquired external cell-region characteristic data 220 (s53). A regression equation (first regression equation) by the external cell-region characteristic multiple regression analysis is, for example, as follows.

$$y_A = b_{0A} + x_{1A}b_{1A} + x_{2A}b_{2A} + \ldots + x_{nA}b_{nA} \qquad \text{Equation 2}$$

In the above equation, the subscripts y, b, and x indicate the identifiers of the external regions. In the above equation, the multiple regression analysis is performed for an external region A. The complement model generation unit 105 uses the data item (for example, number of owned vehicles) corresponding to the missing data item in the external cell-region characteristic data 220 with an objective variable as $y_A$, and uses the explanatory variables in the explanatory variable pattern with the explanatory variables as $x_{1A}$, $x_{2A}$, and the like. For example, when the explanatory variable pattern in which the pattern number in the model generation data 130 illustrated in FIG. 9 is "p02" is provided, the explanatory variables $x_{1A}$, $x_{2A}$, $x_{3A}$, . . . to be used are the population, the age population under 15, the age population over 65, and the like.

The complement model generation unit 105 uses the objective variable and the explanatory variable in the external cell-region characteristic data 220 in the external region A to obtain $b_0$ (intercept) in the above regression equation and $b_i$ (i=1 to n) which is a partial regression coefficient of each explanatory variable. In the following description, $b_0$ (intercept) and the partial regression coefficient $b_i$ (i=1 to n) are collectively referred to as a cell-region characteristic partial regression coefficient $b_i$ (i=0 to n).

Returning to FIG. 10, the complement model generation unit 105 tests the significance of the above regression equation by an F test or the like (referred to as a "cell analysis significance test").

The complement model generation unit 105 tests the significance of all the cell-region characteristic partial regression coefficients $b_i$ in order from i=0 to n one by one. The complement model generation unit 105 firstly sets i to 0 (s33). Then, the complement model generation unit obtains a difference between all the cell-region characteristic partial regression coefficient $b_i$ from the cell-region characteristic partial regression information by the following equation (s34), for all combinations of two external regions selected from all the external regions acquired by the data acquisition unit 104.

$$\Delta b_{0AB} = b_{0B} - b_{0A} \qquad \text{Equation 3}$$

The above equation corresponds to a case where an external region A and an external region B are selected as the two external regions. In the above equation, a difference $\Delta b_{0AB}$ is obtained by using the cell-region characteristic partial regression coefficient $b_0$ (intercept) as the calculation target of the difference. The complement model generation unit 105 obtains the difference $\Delta b_i$ between all the cell-region characteristic partial regression coefficients $b_i$ for all combinations of the two external regions by the above equation.

The complement model generation unit 105 tests a hypothesis of "the difference of the cell-region characteristic partial regression coefficient is 0" by using the difference $\Delta b_i$ of the cell-region characteristic partial regression coefficients $b_i$ for all combinations of the two external regions selected from all the extracted external regions (s35). When the complement model generation unit 105 determines that the above hypothesis is statistically "significant" (s35: YES), the complement model generation unit obtains the mean value of the cell-region characteristic partial regression coefficient $b_i$ (s36). The complement model generation unit 105 uses the value of the significance level included in the model generation data 130 in this test. The complement model generation unit 105 determines the significance based on the test result. The test result of the significance is reflected in the numerical value of the significance ratio of "cell analysis" on the use complement model selection screen 70, which will be described later along with FIG. 15.

When the complement model generation unit 105 determines that the above hypothesis is statistically "not significant" (s35: NO), the complement model generation unit performs multiple regression analysis (referred to as a "region characteristic data multiple regression analysis process s37" below) based on the difference $\Delta b_i$ of the cell-region characteristic partial regression coefficient $b_i$ and the information included in the external region characteristic data 230.

Figure 13:
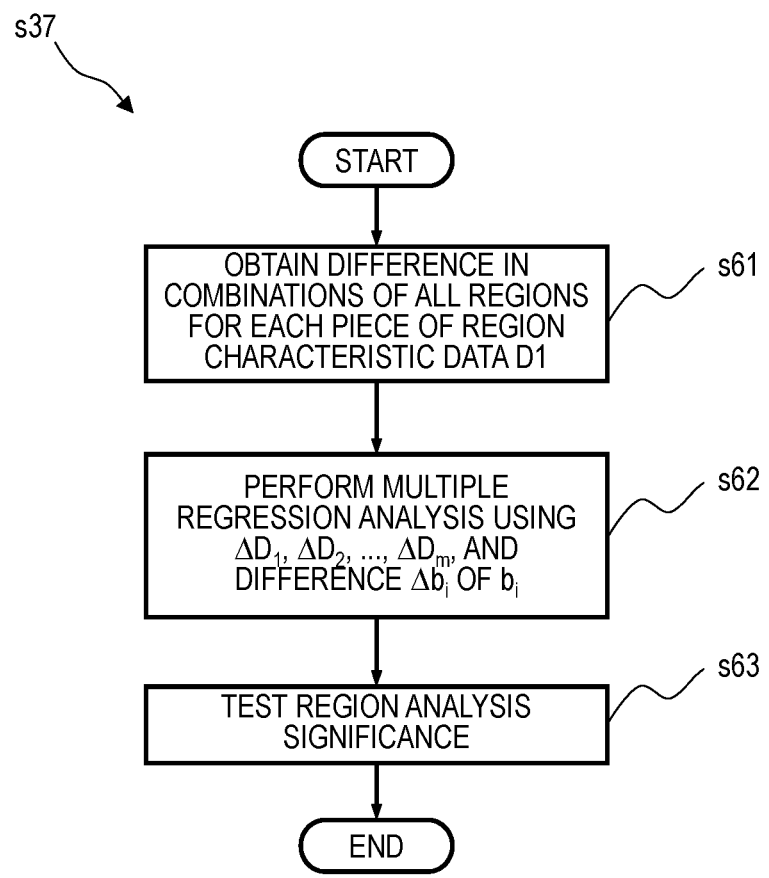
FIG. 13 is a flowchart illustrating an example of a region characteristic data multiple regression analysis process.

FIG. 13 is a flowchart illustrating an example of the region characteristic data multiple regression analysis process s37. Firstly, the complement model generation unit 105 obtains the difference of the external region characteristic data 230 from the following equation, for all combinations for two external regions selected from the firstly-extracted external regions (s61).

$$\Delta D_{1AB} = D_{1B} - D_{1A} \qquad \text{Equation 4}$$

The above equation is an equation for calculating the difference $\Delta D_{1AB}$ between the values $D_{1A}$ and $D_{1B}$ of the same data item $D_1$ in external region characteristic data of two regions being the external region A and the external region B. For example, in a case of the external region characteristic data 230 illustrated in FIG. 11B, for example, when $D_1$ indicates the area, $D_{1A}$ and $D_{1B}$ are "32.1" and "14.2", respectively, and $\Delta D_{1AB} = D_{1B} - D_{1A} = 17.9$.

The complement model generation unit 105 performs multiple regression analysis, for example by using the difference $Ob_i$ of the cell-region characteristic partial regression coefficient obtained by Equation 3 and the difference $\Delta D_{1AB}$ of the external region characteristic data obtained by Equation 4, for the same data item (s62). At this time, the complement model generation unit 105 performs multiple regression analysis by the following regression equation (second regression equation) for all combinations for two external regions selected from the extracted external regions.

$$\Delta b_i = g_1 \Delta D_1 + g_2 \Delta D_2 + \ldots + g_m \Delta D_m \quad \text{Equation 5}$$

In a case of the external region characteristic data 230 illustrated in FIG. 11B, in Equation 5, for example, the difference $\Delta b_i$ of the cell-region characteristic partial regression coefficient is used as the objective variable, and, for example, the difference in area, the difference in the number of complex commercial facilities, and the like are used as the explanatory variable $\Delta D_j$ (j=1 to m).

The complement model generation unit 105 performs a process (referred to as a "region analysis significance test" below) of testing the significance of the regression equation of Equation 5 by the F test and the like to which the significance level of the model generation data 130 is applied, similar to the cell-region characteristic data multiple regression analysis process s32 illustrated in FIG. 12 (s63). The significance of the regression equation represented by the above equation is reflected in the numerical value of the significance ratio of the "region analysis" included in the use complement model selection screen 70, which will be described later along with FIG. 15.

Returning to FIG. 10, when the complement model generation unit 105 executes the above-described cell analysis significance test and region analysis significance test for one cell-region characteristic partial regression coefficient, i is set to (i+1) (s38).

The complement model generation unit 105 repeats the loop processes of s34 to s38 until the cell analysis significance test and the region characteristic data multiple regression analysis process s37 are executed for all the cell-region characteristic partial regression coefficients $b_i$ (s39: NO).

When the complement model generation unit 105 executes the cell analysis significance test and the region characteristic data multiple regression analysis process s37 for all the cell-region characteristic partial regression coefficients $b_i$ (s39: YES), then the complement model generation unit 105 generates the cell-region characteristic partial regression information 240 and region-characteristic partial regression information 250 (s40).

FIG. 14A illustrates an example of the cell-region characteristic partial regression information 240. As illustrated in FIG. 14A, the illustrated cell-region characteristic partial regression information 240 indicates a data table in which the cell-region characteristic partial regression coefficient $b_i$ in the regression equation of Equation 1 and the determination result of the cell analysis significance test are associated with each other for each of a plurality of external regions. The determination result is set to "o" when the result is "significant" and is set to "x" when the result is "not significant". The significance ratio of the cell analysis displayed in a significance ratio display field 76 of the use complement model selection screen 70, which will be described later along with FIG. 15, is a ratio of the external region determined to be significant by the cell analysis significance test, to all the external regions as the target of the cell-region characteristic multiple regression analysis.

FIG. 14B illustrates an example of the region-characteristic partial regression information 250. As illustrated in FIG. 14B, the illustrated region-characteristic partial regression information 250 indicates a data table in which the partial regression coefficient (region characteristic partial regression coefficient $g_i$) in the regression equation of Equation 4 and the determination result of the region analysis significance test are associated with each other for each of the cell-region characteristic partial regression coefficient $b_i$ in the regression equation of Equation 1. The significance ratio of the region analysis displayed in a significance ratio display field 76 of the use complement model selection screen 70, which will be described later along with FIG. 15, is a ratio of the cell-region characteristic partial regression coefficient determined to be significant by the region characteristic multiple regression analysis, to all the cell-region characteristic partial regression coefficients as the target of the region characteristic multiple regression analysis.

Returning to FIG. 10, the complement model generation unit 105 generates a complement model in which the complement data item is expressed using the data item included in one explanatory variable pattern, the cell-region characteristic partial regression coefficient, the region characteristic partial regression coefficient, and the external region characteristic information (s41). Equations representing the complement model are shown below.

$$y = b_{0A} + x_1(b_{1A} + \Delta b_1) + x_2(b_{2A} + \Delta b_2) + \ldots + x_n(b_{nA} + \Delta b_n) \quad \text{Equation 6}$$

$\Delta b_j$ (j=1 to n) in Equation 5 is represented by Equation 7.

$$\Delta b_j = g_{1j}(D_1 - D_{1A}) + g_{2j}(D_2 - D_{2A}) + \ldots \quad \text{Equation 7}$$

In the above equation, $b_{0A}$, $b_{1A}$, $b_{2A}$, ... indicate, for example, cell-region characteristic partial regression coefficients of the region A. $D_{1A}$, $D_{2A}$, ... indicate, for example, values of the data items designated by the explanatory variable patterns in the external region characteristic data of the region A.

In s26 of FIG. 5, the data complementing unit 106 substitutes the value of the data item in the cell-region characteristic data 120 designated as the explanatory variable into $x_i$ of the equation of the complement model represented by Equation 6, and substitutes the value of the data item in the region characteristic data 110 into $D_j$. In this manner, the data complementing unit obtains y being the complement data information 270.

FIG. 15 illustrates an example of the use complement model selection screen 70 displayed by the user terminal 20 in s15 of FIG. 5. As illustrated in FIG. 15, the use complement model selection screen 70 includes a complement data item display field 71, a recommended use complement model information display field 72, a significance ratio display field 76, a use model number registration field 77, a complement data correction registration field 78, and a "next" button 79.

In the complement data item display field 71, the complement data item in the user setting information 210 is displayed.

In the recommended use complement model information display field 72, information regarding the complement model selected by the complement model selection unit 107 from the complement models for all the explanatory variable patterns (for example, complement model with the minimum deviation) is set. As illustrated in FIG. 15, the recommended use complement model information display field 72 includes an explanatory variable pattern display field 73, a region-unit conversion value display field 74, and a deviation display field 75. Among the fields, the pattern number of the explanatory variable pattern used to generate the recommended complement model is displayed in the explanatory variable pattern display field 73. The total amount of the cell-unit complement data for each generated cell region is displayed in the region-unit conversion value display field 74. In the deviation display field 75, the value of the difference obtained from Equation 1 described above is displayed.

The significance ratio display field 76 includes a display field for the pattern number of the explanatory variable pattern used to generate the complement model, a display field for the item of the explanatory variable, and a display field for the significance ratio of whether or not each complement model is significant when regression analysis is performed. The display field of the significance ratio includes a significance ratio display field for cell analysis and a significance ratio display field for region analysis.

In a use model number registration field 77, the user designates the complement model to be used by the pattern number of the explanatory variable.

The complement data correction registration field 78 includes a checkbox for causing the user to designate whether or not the cell-unit complement data generated by the use complement model corresponding to the pattern number designated by the use model number registration field 77 is corrected, when the complement data item is included in the region characteristic data.

When the next button 79 is operated, the user terminal 20 transmits the pattern number designated in the use model number registration field 77 and the information regarding the necessity of correction, which is input in the complement data correction registration field 78, to the data complementing apparatus 100 (s16).

Figure 16:
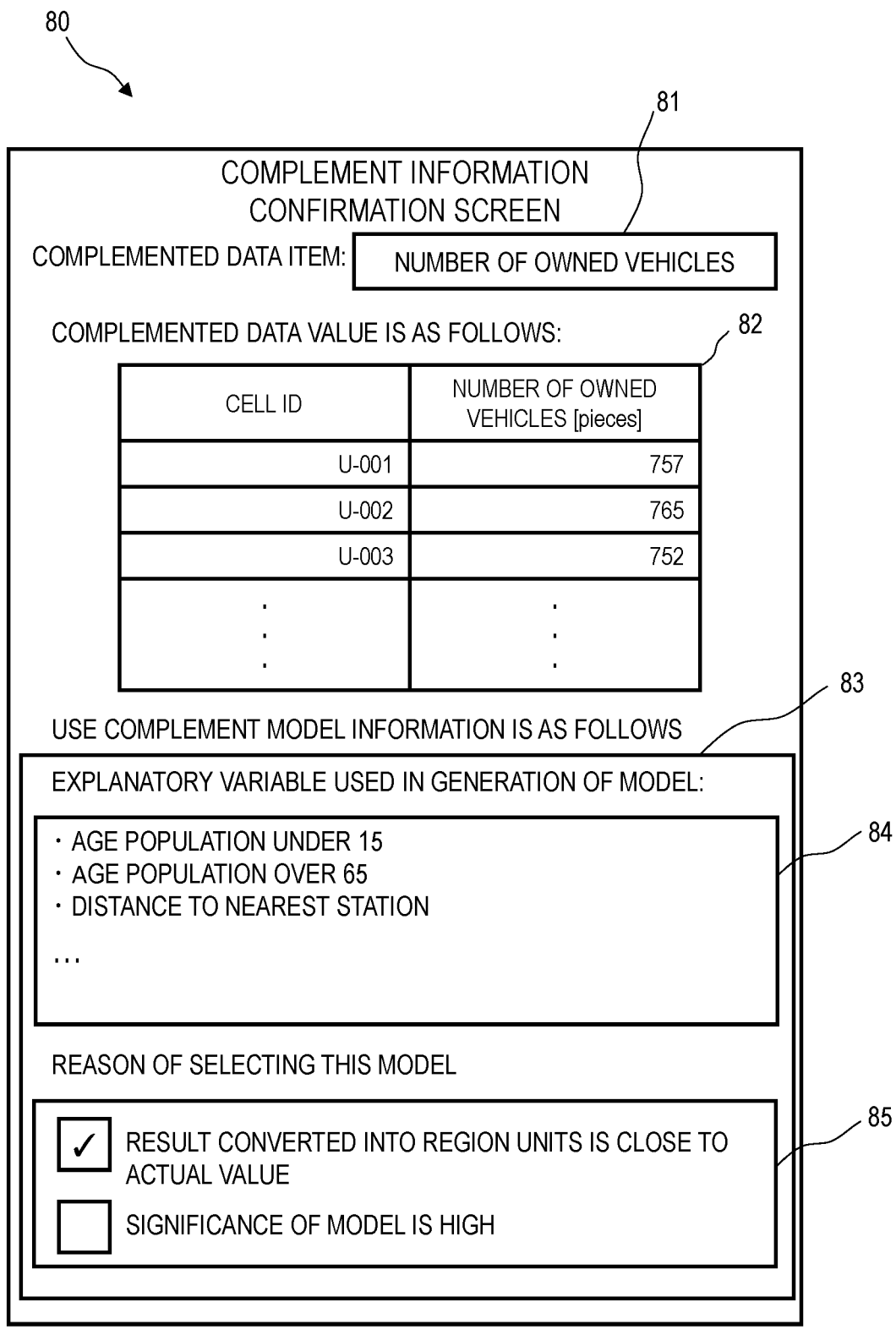
FIG. 16 is a diagram illustrating an example of a complement information confirmation screen.

FIG. 16 illustrates an example of the complement information confirmation screen 80 displayed by the user terminal 20 in s17 of FIG. 5. As illustrated in FIG. 16, the complement information confirmation screen 80 includes a complement data item display field 81, a cell-unit complement data information display field 82, a use complement model information display field 83, and the like.

The complement data items are displayed in the complement data item display field 81, and cell-unit complement data based on the use complement model is displayed in the cell-unit complement data information display field 82 for each cell region.

Information regarding the use complement model (explanatory variable 84 used to generate the use complement model, reason 85 for selecting the use complement model, and the like) is displayed in the use complement model information display field 83. The reason 85 for selecting the use complement model is a field for causing the user to select information such as, for example, that the deviation is small or the model has high significance.

When the pattern number of the explanatory variable pattern other than the explanatory variable patterns displayed in the recommended use complement model information display field 72 on the use complement model selection screen 70 is input to the use model number registration field 77 by the user terminal 20, the data complementing apparatus 100 may display this as the reason 85 for which the use complement model is selected.

FIG. 17 illustrates an example of the complement model information 260 in which the information of the complement model generated in the complement model generation process s25 is stored. The complement model information 260 includes information in which the complement model equation, the region conversion value, the deviation, the significance ratio for the cell analysis and the region analysis is associated with each explanatory variable pattern (pattern number). The complement model information 260 is used as information displayed on the use complement model selection screen 70.

Figure 18:
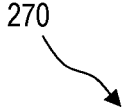
FIG. 18 is a diagram illustrating an example of complement data information.

FIG. 18 illustrates an example of the complement data information 270 in which information regarding the complement data generated by the complement data generation process s5 is stored. As illustrated in FIG. 18, the complement data information 270 includes information in which the pattern number of the explanatory variable pattern (p01, p02, p03, . . . ) and the complement data (for example, value of the number of owned vehicles) are associated with each other for each of cell regions (U-001, U-002, . . . ) belonging to a region U. For example, the illustrated complement data information 270 includes information indicating that the complement data calculated by using the complement model generated by the p01 explanatory variable pattern is 780 in the cell region corresponding to U-001.

The complement data of the complement data information 270 is corrected by the complement data correction unit 108 when an instruction to perform correction is issued in the complement data correction registration field 78 of the use complement model selection screen 70 illustrated in FIG. 15 (S29 in FIG. 5). The above correction is performed by, for example, using the ratio of the deviation between the region conversion value and the value of the actual complement data item in the region characteristic data as a coefficient, and multiplying the coefficient by the complement data for each cell region. The complement data correction unit 108 updates the complement data information 270 according to the correction content.

<Effect>

According to the data complementing apparatus 100 of the embodiment described above, it is possible to efficiently supplement the missing data in the data related to the region by using the existing information.

The data complementing apparatus 100 generates a complement model that complements the value of the missing data item in the cell region in which the region is divided into a mesh based on the external region characteristic data 230 of the external region, and the complement data is based on the generated complement model. Therefore, complement data can be generated accurately even though there is no external region similar to the region.

Further, since the data complementing apparatus 100 tests the significance of the regression equation using the significance level received from the user, the user can efficiently obtain the complement data with the required accuracy according to the purpose of the service and the like.

Since the data complementing apparatus 100 generates a complement model for each of the plurality of explanatory variable patterns, the user can select an appropriate complement model from the plurality of complement data generated based on the complement models having different explanatory variable patterns.

Since the data complementing apparatus 100 generates the complement data based on the complement model having the highest reliability based on a plurality of complement models, the user can obtain the optimum complement data without comparing and examining a plurality of pieces of complement data.

The data complementing apparatus 100 can appropriately correct the complement data based on a deviation when there is the deviation between the aggregated value of the complement data of the cell region of the region and the value of the data item corresponding to the missing data item in the region characteristic data.

It should be noted that the embodiments described above are merely examples for explaining the present invention in an easy-to-understand manner, and the concept of the present invention includes various modifications and applications to the above embodiments. Those skilled in the art will recognize that various changes and modifications may be made in form and detail without departing from the spirit and scope of the claimed subject matter.

For example, some components in the embodiment can be replaced with the components in another embodiment, and the configuration of another embodiment can be added to the configuration of the embodiment. Regarding some components in the embodiments, other components can be added, deleted, and replaced.

For example, the cell region 301 is not limited to a rectangular region, and may have another shape such as an equilateral triangle as long as the region 300 is divided into predetermined regions having the same shape without gaps.

Further, for example, the data complementing apparatus 100 may be configured to also function as the user terminal 20.

In the above embodiment, the data complementing apparatus 100 generates a complement model for calculating cell-unit complement data by using multiple regression analysis, but the complement model may be generated using other analysis methods such as quantification analysis and cluster analysis.

In the above-described embodiment, control lines and information lines considered necessary for the descriptions are illustrated, and not all the control lines and the information lines in the product are necessarily shown. All components may be connected to each other. Further, in the above description, various types of information are illustrated by a table form (table), but the pieces of information may be managed in a form other than the table.

What is claimed is:

1. A data complementing system including an information processing apparatus, the system comprising:
a processor configured to store
region characteristic data that includes values of a plurality of data items regarding a predetermined region,
cell-region characteristic data that includes values of a plurality of data items regarding a cell region that is a region obtained by dividing the region into a mesh,
information indicating a missing data item that is the data item of missing data being data missed in the cell-region characteristic data,
external region characteristic data that includes values of a plurality of data items regarding an external region that is different from the region, and
an external cell-region characteristic data that includes values of a plurality of data items regarding an external cell region obtained by dividing the external region into a mesh,
wherein the processor is configured to generate a complement model for generating complement data that is for complementing the missing data, based on the external region characteristic data and the external cell-region characteristic data,
wherein the processor is configured to generate a first regression equation for each of a plurality of the external regions, the first regression equation in which the missing data item is expressed with the data item in the external cell-region characteristic data, which corresponds to the missing data item,
wherein the processor is configured to generate a second regression equation for all combinations obtained by selecting two of the plurality of the external regions, the second regression equation in which a difference between partial regression coefficients in the first regression equation for each of the external regions is used as an objective variable, and a difference between the values of the same data items in the external region characteristic data for the two selected external regions is used as an explanatory variable,
wherein the processor is configured to generate the complement model based on the first regression equation and the second regression equation, the complement model in which the missing data item is expressed with the data item included in an explanatory variable pattern, the partial regression coefficient in the first regression equation, and a partial regression coefficient in the second regression equation, the explanatory variable pattern being a combination of one or more data items in the cell-region characteristic data,
wherein the processor is configured to store a plurality of the explanatory variable patterns,
wherein the processor is configured to generate the complement model for each of the plurality of the explanatory variable patterns,
wherein the processor is configured to display the complement model for each of the plurality of the explanatory variable patterns and associated significance ratios for a user to select a desired explanatory variable pattern based on the significance ratios, and
wherein the processor is configured to display reasoning for selection of the desired explanatory variable pattern and the complement data generated from the complement model associated with the explanatory variable pattern selected by the user.

2. The data complementing system according to claim 1, wherein
the processor is further configured to store a significance level used for determining significance of each of a plurality of the complement models, and
the processor is further configured to
determine the significance of the first regression equation and the significance of the second regression equation based on the significance level for each of the plurality of the complement models, and
generate a first significance determination result indicating the significance of the first regression equation and a second significance determination result indicating the significance of the second regression equation, for each of the plurality of the complement models.

3. The data complementing system according to claim 2, wherein to display the complement model for each of the plurality of the explanatory variable patterns and associated significance ratios for a user to select a desired explanatory variable pattern based on the significance ratios comprises:
the processor is further configured to
obtain, by the processor, a deviation between the value of the data item corresponding to the missing data item in the region characteristic data and a sum of the values of the complement data for all cell regions belonging to the predetermined region, for each of the plurality of the complement models, output, by the processor, at least any of the deviation, the first significance determination result, and the second significance determination result, and display, by the processor, a selection of the complement model corresponding to each of the plurality of the explanatory variable patterns for the user to select, wherein the significance ratios comprise the first significance determination result and the second significance determination result of each of the plurality of the explanatory variable patterns.

4. The data complementing system according to claim 3, further comprising:
the processor is further configured to generate the complement data based on the selected complement model.

5. The data complementing system according to claim 4, further comprising:
the processor is further configured to correct the generated complement data based on the deviation.

6. The data complementing system according to claim 4, further comprising:
the processor is further configured to output at least any of information on the selected complement model and complement data generated by the complement model.

7. The data complementing system according to claim 1, further comprising:
the processor is further configured to receive an input of at least any of the region characteristic data, the cell-region characteristic data, and the information indicating the missing data item.

8. A data complementing method, the method comprising:
by an information processing apparatus, storing region characteristic data that includes values of a plurality of data items regarding a predetermined region, cell-region characteristic data that includes values of a plurality of data items regarding a cell region that is a region obtained by dividing the region into a mesh, information indicating a missing data item that is the data item of missing data being data missed in the cell-region characteristic data, external region characteristic data that includes values of a plurality of data items regarding an external region that is different from the region, and an external cell-region characteristic data that includes values of a plurality of data items regarding an external cell region obtained by dividing the external region into a mesh, generating a complement model for generating complement data that is for complementing the missing data, based on the external region characteristic data and the external cell-region characteristic data, generating a first regression equation for each of a plurality of the external regions, the first regression equation in which the missing data item is expressed with the data item in the external cell-region characteristic data, which corresponds to the missing data item, generating a second regression equation for all combinations obtained by selecting two of the plurality of the external regions, the second regression equation in which a difference between partial regression coefficients in the first regression equation for each of the external regions is used as an objective variable, and a difference between the values of the same data items in the external region characteristic data for the two selected external regions is used as an explanatory variable, generating the complement model based on the first regression equation and the second regression equation, the complement model in which the missing data item is expressed with the data item included in an explanatory variable pattern, the partial regression coefficient in the first regression equation, and a partial regression coefficient in the second regression equation, the explanatory variable pattern being a combination of one or more data items in the cell-region characteristic data, storing a plurality of the explanatory variable patterns, generating the complement model for each of the plurality of the explanatory variable patterns, displaying the complement model for each of the plurality of the explanatory variable patterns and associated significance ratios for a user to select a desired explanatory variable pattern based on the significance ratios, and displaying reasoning for selection of the desired explanatory variable pattern and the complement data generated from the complement model associated with the explanatory variable pattern selected by the user.

9. The data complementing method according to claim 8, further comprising:
by the information processing apparatus, storing a significance level used for determining significance of each of a plurality of the complement models;

determining the significance of the first regression equation and the significance of the second regression equation based on the significance level for each of the plurality of the complement models; and generating a first significance determination result indicating the significance of the first regression equation and a second significance determination result indicating the significance of the second regression equation, for each of the plurality of the complement models.

10. The data complementing method according to claim 9, wherein displaying the complement model for each of the plurality of the explanatory variable patterns and associated significance ratios for a user to select a desired explanatory variable pattern based on the significance ratios comprises:
by the information processing apparatus, obtaining a deviation between the value of the data item corresponding to the missing data item in the region characteristic data and a sum of the values of the complement data for all cell regions belonging to the predetermined region, for each of the plurality of the complement models;

outputting at least any of the deviation, the first significance determination result, and the second significance determination result; and receiving a selection of the complement model corresponding to each of the plurality of the explanatory variable patterns for the user to select, wherein the significance ratios comprise the first significance determination result and the second significance determination result of each of the plurality of the explanatory variable patterns.

11. The data complementing method according to claim 10, further comprising:
by the information processing apparatus, generating the complement data based on the selected complement model.

* * * * *